US011493243B2

(12) United States Patent
Hauleitner et al.

(10) Patent No.: US 11,493,243 B2
(45) Date of Patent: Nov. 8, 2022

(54) COOLING SYSTEM AND METHOD FOR OPERATING A COOLING SYSTEM

(71) Applicant: Aktiebolaget SKF, Gothenburg (SE)

(72) Inventors: Rudolf Hauleitner, Steyr (AT); Christine Matta, Utrecht (NL); Guillermo Enrique Morales Espejel, Ijsselstein (NL); Hans Wallin, Cape Coral, FL (US)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 16/696,638

(22) Filed: Nov. 26, 2019

(65) Prior Publication Data

US 2020/0166252 A1    May 28, 2020

Related U.S. Application Data

(60) Provisional application No. 62/771,625, filed on Nov. 27, 2018.

(51) Int. Cl.
*F25B 43/02* (2006.01)
*F25B 31/00* (2006.01)
(Continued)

(52) U.S. Cl.
CPC .......... *F25B 31/002* (2013.01); *F16C 37/007* (2013.01); *F25B 31/004* (2013.01);
(Continued)

(58) Field of Classification Search
CPC .. F25B 1/00; F25B 1/02; F25B 31/004; F25B 31/002; F25B 31/006; F25B 31/008;
(Continued)

(56) References Cited

U.S. PATENT DOCUMENTS

| 5,497,631 A | 3/1996 | Lorentzen et al. |
| 5,881,564 A | 3/1999 | Kishimoto et al. |

(Continued)

FOREIGN PATENT DOCUMENTS

| EP | 0664424 | 7/1995 |
| GB | 777232 | 6/1957 |

OTHER PUBLICATIONS

Haverkamp et al., "Adsorption of Hydrogen Fluoride on Alumina," Surface and Interface Analysis, vol. 19, pp. 139-144 (1992).

(Continued)

*Primary Examiner* — Henry T Crenshaw
*Assistant Examiner* — Kamran Tavakoldavani
(74) *Attorney, Agent, or Firm* — Reed Smith LP (57) ABSTRACT

Disclosed is a cooling system comprising a refrigerant cycle for cycling refrigerant from at least a compressor unit for com-pressing gaseous refrigerant to a condenser unit for condensing gaseous refrigerant to liquid refrigerant, from the condenser unit to an evaporator unit for evaporating the liquid refrigerant to gaseous refrigerant, and from the evaporating unit back to the compressor unit, and a lubrication cycle having at least one lubricating refrigerant supply line for providing refrigerant as lubricant to a bearing assembly, wherein the at least one lubricating refrigerant supply line branches off from the refrigerant cycle at the condenser unit for providing refrigerant to the bearing assembly, and re-unites with the refrigerant cycle at the evaporator unit, for feeding back refrigerant from the bearing assembly to the refrigerant cycle.

13 Claims, 3 Drawing Sheets

(51) Int. Cl.
*F16C 37/00* (2006.01)
*F25B 1/02* (2006.01)
*F25B 41/42* (2021.01)

(52) U.S. Cl.
CPC .................. *F25B 1/02* (2013.01); *F25B 41/42* (2021.01); *F25B 2400/16* (2013.01); *F25B 2500/16* (2013.01)

(58) Field of Classification Search
CPC ...... F25B 41/30; F25B 43/003; F25B 43/006; F25B 2400/13; F25B 2500/16; F16C 37/007; F04C 29/025
USPC .......................................................... 62/84
See application file for complete search history.

(56) References Cited

U.S. PATENT DOCUMENTS

| | | |
|---|---|---|
| 5,899,091 A | 5/1999 | Fraser, Jr. et al. |
| 6,176,092 B1 * | 1/2001 | Butterworth .......... F04D 29/023 62/193 |
| 6,279,340 B1 | 8/2001 | Butterworth et al. |
| 6,564,560 B2 | 5/2003 | Butterworth et al. |
| 6,840,058 B2 | 1/2005 | Suzuki et al. |
| 7,563,739 B2 | 7/2009 | Kilthau et al. |
| 8,104,298 B2 | 1/2012 | Sishtia |
| 9,335,080 B2 | 5/2016 | Ward et al. |
| 9,676,492 B2 | 6/2017 | Tichborne et al. |
| 9,879,164 B2 | 1/2018 | Kujak |
| 2016/0160856 A1 | 6/2016 | Wallin et al. |
| 2016/0160857 A1 | 6/2016 | Wallin et al. |
| 2017/0097007 A1 | 4/2017 | Sishtla |
| 2017/0355921 A1 * | 12/2017 | Matsumoto .......... C10M 105/38 |
| 2018/0066871 A1 | 3/2018 | Matsukura et al. |
| 2018/0245719 A1 | 8/2018 | Attarwala et al. |
| 2019/0145677 A1 | 5/2019 | Incorvia |

OTHER PUBLICATIONS

"What is the Reaction of Aluminium with Hydrofluoric Acid?" https://www.quora.com/What-is-the-reaction-of-aluminium-with-hydrofluoric-acid, pp. 1-2.

* cited by examiner

COOLING SYSTEM AND METHOD FOR OPERATING A COOLING SYSTEM

PRIORITY CLAIM

This application claims the benefit of priority to U.S. Provisional Application No. 62/771,625, filed Nov. 27, 2018, under 35 U.S.C. § 119, the entire contents which are herein incorporated by reference as if set forth herein in their entirety.

FIELD

The inventive concepts disclosed herein relate to a cooling system as well as to a method for operating such a cooling system.

BACKGROUND

Cooling systems, such as a chiller or air conditioning system, generally include a compressor unit, a condenser unit, an expansion device and an evaporator unit, which are connected into a so-called cooling cycle or refrigerant cycle. In the cooling cycle refrigerant is cycled from at least the compressor unit for compressing gaseous refrigerant to the condenser for condensing gaseous refrigerant to liquid refrigerant, from the condenser unit to the expansion unit for expanding the liquid refrigerant, from the expansion unit to an evaporator unit for evaporating the liquid refrigerant to gaseous refrigerant, and from the evaporating unit back to the compressor unit. Usually, such a cooling system removes heat from a liquid via the vapor-compression refrigerant cycle. The cooled liquid may then be used to cool air (e.g., air conditioning) or in an industrial process.

DETAILED DESCRIPTION

In the cooling system, the compressor unit itself may be a centrifugal compressor, which includes one or more impellers that compress the refrigerant. The impellers are mounted on a rotating shaft which is supported by a plurality of bearings. The bearing assembly may require a steady supply of lubricant, which is often oil. However, in some recent applications, refrigerant has also have been used to lubricate the bearings rather than oil. For that, a so-called lubrication cycle is provided which has at least one lubricating refrigerant supply line for providing refrigerant as lubricant to the bearing assembly. For example, various exemplary embodiments of such cooling systems are disclosed in co-pending U.S. patent application Ser. No. 16/691,118, titled "Refrigerant Lubricated Bearings" on Nov. 21, 2019 and U.S. patent application Ser. No. 16/685,704, titled "Cooling System and Method for Operating a Cooling System" on Nov. 15, 2019, each of which also claims benefit of U.S. Provisional Application No. 62/771,625, filed Nov. 27, 2018. The entire contents of U.S. patent application Ser. No. 16/691,118, titled "Refrigerant Lubricated Bearings" on Nov. 21, 2019 and U.S. patent application Ser. No. 16/685,704, titled "Cooling System and Method for Operating a Cooling System" on Nov. 15, 2019 are herein incorporated by reference as if set forth herein in their entirety.

Further, a pump may be used to drive the refrigerant flow to the bearings. However, the pump may cavitate making it more difficult to supply the refrigerant to the bearings. There can also be operating conditions under which the supply of refrigerant provided by the pump is insufficient or the state of the refrigerant is a mixture of liquid and vapor so that the bearings may not be lubricated, properly. Additionally, there is a general reliability problem as the flow of bearing lubricant stops, if the pump for some reason stops working. A common reason why the pump stops working is loss of electric power. Moreover, the pump that is constantly engaged also wears and consumes power. It is therefore within the scope of the present disclosure to provide a cooling system with refrigerant lubricated bearings, which is operating reliable and cost-efficient, which is achieved by the disclosure set forth herein.

In the following a cooling system is suggested which comprises a refrigerant cycle for cycling refrigerant from at least a compressor unit for compressing gaseous refrigerant to a condenser unit for condensing gaseous refrigerant to liquid refrigerant, from the condenser unit to an evaporator unit for evaporating the liquid refrigerant to gaseous refrigerant, and from the evaporating unit back to the compressor unit. The cooling system further comprises a lubrication cycle having at least one lubricating refrigerant supply line for providing refrigerant as lubricant to a bearing assembly, which may be part of the compressor unit.

For providing a stable supply of lubricating refrigerant to the bearing assembly, the at least one lubricating refrigerant supply line branches off from the refrigerant cycle at the condenser unit for providing refrigerant to the bearing assembly, and reunites with the refrigerant cycle at the evaporator unit, for feeding back refrigerant from the bearing assembly to the refrigerant cycle. Thereby, a pressure difference between the condenser unit and evaporator unit may be used for transporting the lubricating refrigerant in the lubricating cycle. The pressure difference results from the difference between the high pressure level of the compressor unit and the low pressure level of the evaporator unit. This transports the refrigerant not only through the refrigerant cycle but also through the lubrication cycle.

According to a further aspect and/or an example embodiment, the refrigerant cycle may also comprise an economizer unit. An economizer unit is usually used in a cooling system with a two stage (or more generally multi stage) compressor. Thereby the expansion process is separated into two (or more) steps with an economizer in-between. Hence, liquid refrigerant from the condenser unit enters a first expansion device, which reduces the pressure of the refrigerant. This pressure drop causes a portion of the liquid refrigerant to evaporate, and the resulting mixture of liquid and gaseous refrigerant enters the economizer unit. Consequently, the pressure in the economizer unit is between that of the condenser unit and the evaporator unit.

The economizer unit itself is connected to a second expansion device and to an inlet to the second stage of the two stage compressor. In the economizer unit, the gaseous refrigerant is separated from the liquid refrigerant, and only the remaining liquid refrigerant is fed to the second expansion device and further to the evaporator unit. The gaseous part of the refrigerant in turn is recompressed by the second stage of the compressor, and fed back from the outlet of the second stage compressor to the condenser unit. Since part of the refrigerant is already vaporized upstream of the evaporator, the amount of required compressor power is reduced as the gaseous part of the refrigerant generated in the economizer only needs to be compressed by the second stage impeller. In a system without an economizer, more gaseous refrigerant would be released and more gaseous refrigerant would be recompressed instead of being in liquid form and evaporate before going back to the first stage of the compressor. Thus, by using an economizer unit, the system efficiency is increased (by 4% to 6% or equivalent thereof), as the recompression of gaseous refrigerant is waste of energy.

In example embodiments, where an economizer unit is present, there is the additional or alternative possibility to branch off the lubricating supply line from the compressor unit and/or from the economizer unit. Using the economizer as branch off for the lubricating refrigerant supply line allows for a slower movement of the refrigerant in the lubrication cycle and thereby for a more controlled distribution of the refrigerant to the bearing assembly. It also reduces the speed with which the refrigerant is introduced or sprayed into the bearing assembly.

It may be a further appreciated by one skilled in the art that the lubricating refrigerant supply line terminates in a nozzle or injection device for directing and introducing refrigerant to the bearing assembly. The nozzle or injection device allows for an optimized and guided provision of lubricating refrigerant to the bearing assembly, and thereby for an improved lubrication. Further, it will be appreciated by one skilled in the art that the supply line itself is designed such that the pressure drops across the nozzle rather than throughout the supply line.

According to a further example embodiment, the lubrication cycle has a first lubricating refrigerant supply line branch branching off from the condenser unit and/or from the economizer unit, and a second lubricating refrigerant supply line branch branching off from the evaporator unit, wherein both branches are adapted to supply refrigerant to the bearing assembly. The use of the refrigerant from the evaporator unit may be appreciated by one skilled in the art at startup of the cooling system. At the startup phase, the refrigerant in the evaporator is liquid and can be used for lubricating the bearings before the compressor is started, while there is no liquid refrigerant in the condenser unit, which could be used for lubricating the bearing assembly. Using the refrigerant from the evaporator unit allows for a so-called pre-lubrication cycle during which refrigerant is provided to the bearing assembly before the compressor unit start operating. This in turn ensures a sufficient lubrication of the bearing assembly at all times. Thereby, the service life of the compressor unit may be prolonged. It goes without saying that also more than two branches might be provided.

It is therefore appreciated by one skilled in the art that in the second branch-off from the evaporator a pump is arranged, which may be operated at start up and provides liquid refrigerant to the bearing assembly of the compressor unit before operating the compressor unit. The use of the pump ensures that sufficient refrigerant is provided at the bearing assembly at start up and also in case the pressure difference has not been built up or drops during ordinary operation. Preferably, the pump is controlled such that it starts if the pressure differential between the condenser and/or economizer becomes less than a predetermined value.

To avoid or minimize the risk of cavitation in the pump suction line, the pump speed may be controlled for slow start and/or variable speed.

According to an example embodiment the pump may be arranged in a main lubrication supply line, which is provided by a merging of the first and second branch supply lines upstream of the bearing assembly. The pump may be operated at start up only, or in order to drive the lubricating refrigerant in case of an unexpected drop in pressure difference. However, arranging the pump in the main supply line might increase the flow resistance in the lubrication supply line, as the refrigerant has also to pass the pump.

According to another example embodiment, the cooling system further comprises a filter unit, which is arranged in the lubricating refrigerant supply line upstream of the bearing assembly. Thereby, the filter unit may be arranged in the main supply line and/or in one or both branches depending on the necessity. This filter unit ensures that harmful substances, e.g. water and/or other substances, which may occur due to a break down of the molecules of the refrigerant due to heat, pressure and/or mechanical abrasion, are filtered out of the refrigerant so that the refrigerant which is used for lubricating the bearing assembly is not contaminated. Advantageously, the filter comprises at least one unit for filtering out liquids, such as water and acids, and a second for filtering out contaminate particles.

According to a further example embodiment, an accumulator is arranged in the lubrication cycle line upstream of the bearing assembly. The accumulator is preferably filled up with refrigerant at start-up and ensures that a continuous lubrication is provided at the bearing assembly even during pressure difference variations between the pressure level of the compressor unit/economizer unit and the evaporator unit. The accumulator may also serve as pressurized lubrication refrigerant reservoir at start-up instead of the pump or in case the pump is not working. Consequently, the accumulator is preferably adapted to operate in a pre-lubrication cycle, before the compressor is started.

The accumulator may have two compartments, one on the top that is filled with a gas or may contain a spring, a second that is used for storing pressurize refrigerant. The two compartments are separated by a piston or a rubber bladder.

Such an accumulator works as follows: At start of the relubrication cycle, the second compartment of the accumulator is empty. As pressure builds up, the second compartment starts to fill up with liquid refrigerant. The pressure is balanced by the pressure of the compressed gas in the first compartment or by the compression of the spring, if used. At steady state operation the two compartments have approximately the same volume. This is controlled by selection of gas pressure or spring force in the first compartment.

As mentioned above, the volume of pressurized liquid refrigerant in the second compartments serves as reserve lubricant in case of malfunction of the system for any reason.

A further aspect of the present inventive concepts relate to a method for operating a cooling system according to any one of the preceding claims, wherein the refrigerant being used as lubricant is driven through the lubrication cycle line by a pressure difference between the condenser or economizer and the evaporator.

According to a another example embodiment the cooling system operates as follows: at startup of the cooling system, liquid refrigerant for lubrication is available in the evaporator. As the system pressure is building up, liquid refrigerant becomes available in the condenser. The lubricant pump is first pumping refrigerant from the evaporator, then after having reach a certain pressure difference level, the source of liquid refrigerant is switched to the condenser. Downstream from the pump, the refrigerant is supplied to the compressor bearings for lubrication through a nozzle, then drains from the bearing assembly to the evaporator. In high speed compressors, the nozzle produces a jet that spays refrigerant into the bearings. The pressure drops through the nozzle and the nozzle controls the flow. In low speed compressors, jet injection may not be necessary. The refrigerant can flow into the bearing housing without pressure drop, then through the bearings. In that case, it is also possible that the pump functions as a metering device.

The optional pump may be engaged at all times, but it may be appreciated by one skilled in the art to engage the pump only to pump refrigerant from the evaporator at startup, then to turn it off and to only use the pressure differential between the condenser (or economizer) and the evaporator to drive the lubricating refrigerant flow.

In order to keep a supply of pressurized refrigerant in reserve, in case of a pump malfunction, a hydraulic accumulator is be filled by refrigerant, when the pump is started, which should be in a pre-lubrication cycle, before the compressor is started.

Further example embodiments are defined in the dependent claims as well as in the description and the figures. Thereby, elements described or shown in combination with other elements may be present alone or in combination with other elements without departing from the scope of protection. In the following, example embodiments of the inventive concepts are described in relation to the drawings, wherein the drawings are exemplarily only, and are not intended to limit the scope of protection.

Figure 1:
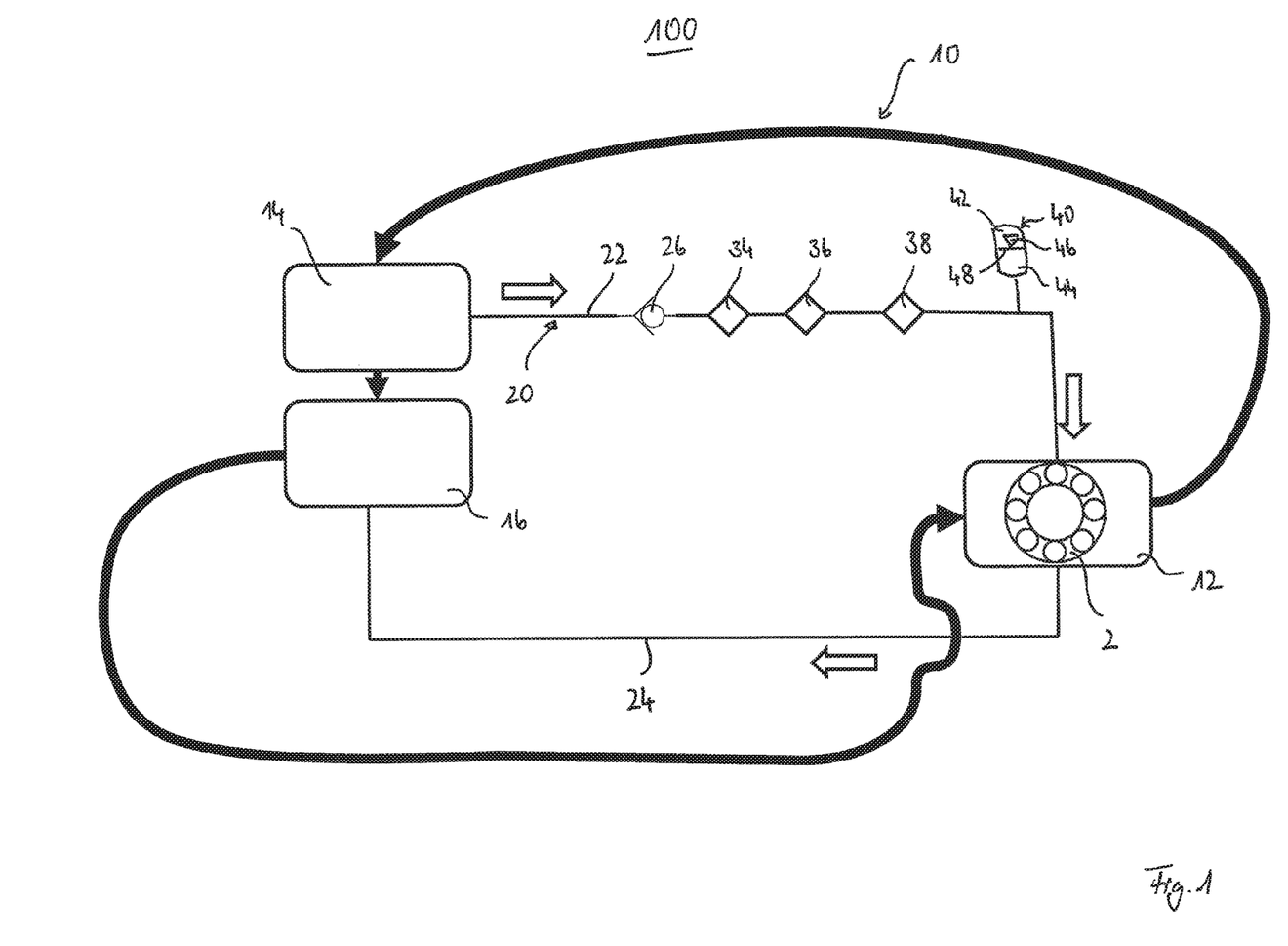
FIG. 1 illustrates a schematic illustration of an example embodiment of a cooling system with refrigerant lubricated bearing assembly.
Figure 2:
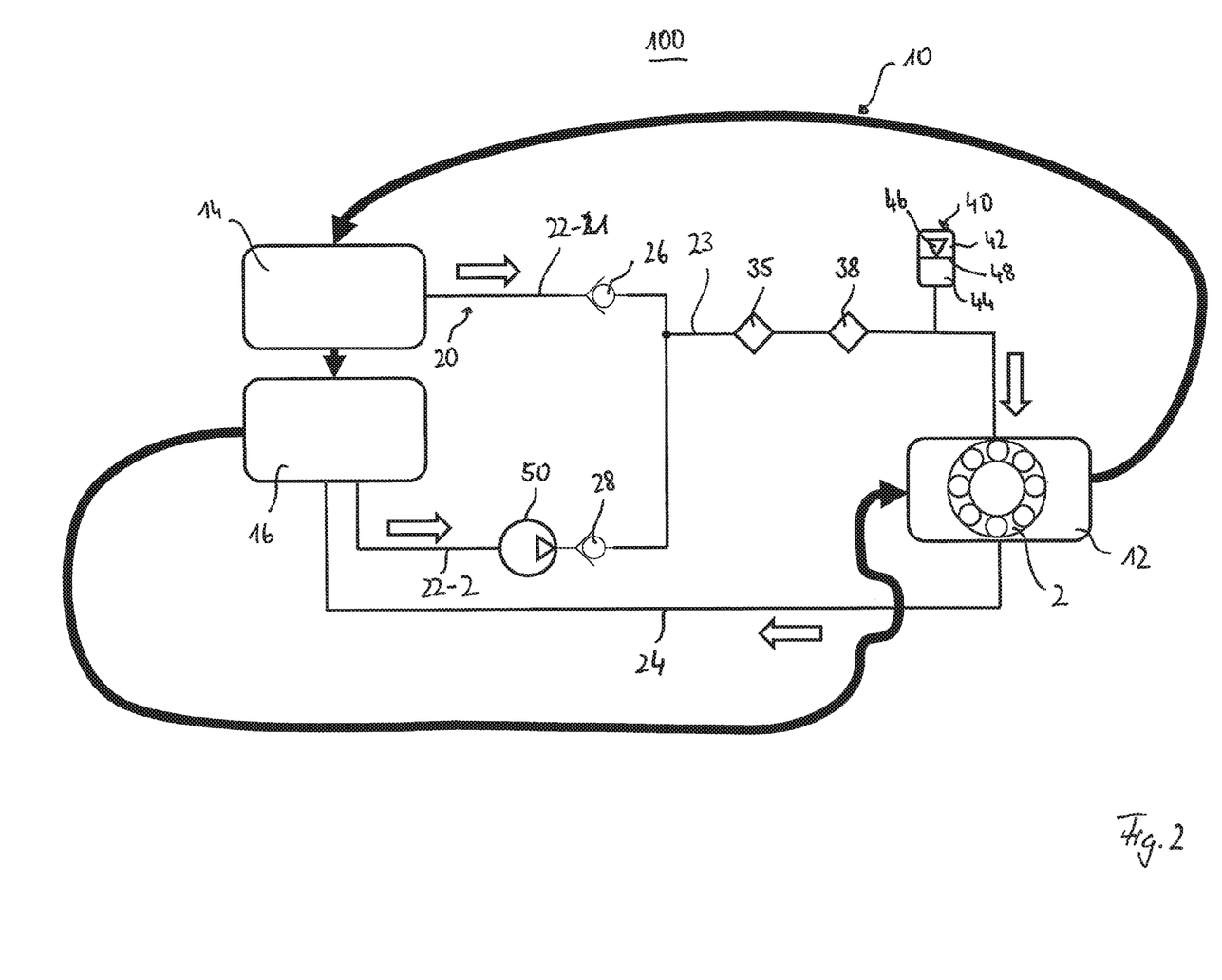
FIG. 2 illustrates a schematic illustration of another example embodiment of a cooling system with refrigerant lubricated bearing assembly.

FIGS. 1 and 2 show each a schematic illustration of a cooling system 100 which a cooling cycle 10 (indicated by thick arrows) and a lubrication cycle 20 (indicated by hollow arrows), wherein the lubrication cycle 20 also comprises refrigerant as lubricant. A cooling system 100, such as a chiller or air conditioning system, generally includes in the cooling cycle 10 a compressor unit 12, a condenser unit 14 and an evaporator unit 16. Optionally there is also an expansion unit (not illustrated), e.g. an expansion valve upstream of the evaporator unit 16, which may be used for reducing the pressure of the refrigerant in the cooling cycle 10.

As can be seen in the cooling cycle 10 of FIGS. 1 and 2, the compressor unit 12 compresses gaseous refrigerant which may is directed to the condenser unit 14 to condense the gaseous refrigerant into liquid refrigerant. The liquid refrigerant is then guided to the evaporator unit 16 for evaporating the liquid refrigerant to gaseous refrigerant, which is then transported back to the compressor unit 12 for providing compressed gaseous refrigerant, again.

The compressor unit 12 itself comprises a bearing assembly 2 with at least one, but usually a plurality of rolling bearings. The bearing assembly 2 is only schematically illustrated in the FIGS. The bearing assembly 2 usually requires lubrication during operation. In order to simplify the design of the cooling systems, it has recently been suggested to use the refrigerant not only in the cooling cycle 10, but also in the lubrication cycle 20 for lubricating the bearing assembly 2 by using the refrigerant as lubricant for the bearing assembly 2.

As illustrated in FIG. 1, for providing the lubricating refrigerant to the bearing assembly 2 part of the refrigerant is branched off from the condenser unit 14 by a lubricating refrigerant supply line 22 and transported to the bearing assembly 2 in the compressor unit 12. The lubricating refrigerant is then introduced into the bearing assembly 2, usually with high-pressure and through a nozzle or injection device (not illustrated) and exits the compressor unit 12 via lubricating refrigerant feedback line 24, for feeding back the lubricating refrigerant to the evaporator unit 16.

Since the pressure level of the condenser unit 14 is much higher than the pressure level of the evaporator unit 16, there is no need for an additional lubricating refrigerant propelling unit, such as a pump, for transporting the lubricating refrigerant through the lubrication cycle 20. For avoiding any reflux of the lubricating refrigerant to the condenser unit 12, it is further appreciated by one skilled in the art to arrange a check valve 26 in the lubricating refrigerant supply line 22 upstream of the compressor unit 12, as illustrated in FIG. 1.

Unfortunately, since the refrigerant is also used as refrigerant in the cooling cycle 10, the refrigerant is exposed to several mechanical components, e.g. compressor, condenser, evaporator, connecting lines, and thereby heat and pressure, as well as to liquid and/or gaseous contaminants, e.g. air and moisture, which may trigger that the molecules in the refrigerant may break down and produce byproduct compounds which are harmful to the bearing assembly 2 used in the compressor unit 12. Additionally, the breakdown of the molecules or may even be caused by the inherent chemical instability of the refrigerant itself. Further, particles originating e.g. from wear or abrasion of the mechanical components, may be present in the refrigerant which are harmful for the bearing assembly 2 in case the refrigerant is used as lubricant.

However, these byproducts and/or particles are very harmful to the refrigerant lubricated bearing assembly as they may lead to corrosion, increased wear, insufficient lubrication conditions or cause otherwise damage in the bearing assembly. Consequently, there is an arrangement of filter units 34, 36, and 38 (FIG. 1) or an arrangement of individual and combined filter units (35, 38) arranged in the lubricating refrigerant supply line 22 upstream of the bearing assembly 2. The filter unit(s) 34, 35, 36, 38 contain materials that may absorb or react with the byproducts, contaminants and/or particles, thereby removing the particles, acids or water from the refrigerant.

The filter units themselves are preferably adapted to adsorb, catch or trap certain molecules from the refrigerant by mechanical, chemical and/or physical adsorption, wherein the kind of adsorption/trapping is depending on the material type, the surrounding environment composition and the expected type of contaminant.

As mentioned above besides the arrangement of filter units as illustrated in FIG. 1, it is also possible to combine some or all filter units for reducing the overall required space or to use synergistic effects. Such an embodiment is illustrated in FIG. 2, where the filter unit 35 is a combination of an acid filter and a desiccant filter. This is particularly preferably, as some of the adoption reaction of acids are competitive to the adsorption of water/moisture, or as mentioned above the reaction product of the chemical reaction may be water, which also needs to be removed from the refrigerant.

As further illustrated in FIGS. 1 and 2, an accumulator 40 is arranged in the lubricating refrigerant supply line 22. The accumulator 40 ensures that a constant lubricating refrigerant supply is provided at the compressor unit 12 even in case the pressure in the supply line 22 is fluctuating. Consequently, the accumulator 40 works as additionally auxiliary reservoir for pressurized refrigerant, which may be fed to the bearing assembly 2 in case of an insufficient lubricating refrigerant supply is detected in the lubricating refrigerant supply line 22.

The accumulator 40 usually has two compartments 42, 44, wherein the top compartment 42 is filled with a gas or may contain a spring, which is adapted to provide a preload/load 46 onto a piston or bladder 48, which separates the compartments 42, 44. The second compartment 44 is used for storing pressurize refrigerant. Such an accumulator 40 works as follows: At start of the lubrication cycle, the second compartment 44 of the accumulator 40 is empty. As pressure builds up, the second compartment 44 starts to fill up with liquid refrigerant. The pressure is balanced by the pressure 46 of the compressed gas in the first compartment 42 or by the compression of the spring, if used. At steady state operation the two compartments 42, 44 have approximately the same volume. This is controlled by selection of gas pressure or spring force 46 in the first compartment 42.

The volume of pressurized liquid refrigerant in the second compartment 44 serves as reserve lubricant in case of malfunction of the system for any reason, e.g. of a unexpected pressure drop.

The lubricating refrigerant supply branch 22 may be branched off of the condenser unit, as explained above, or may alternatively or in addition be branched off from an optional economizer unit. In case an economizer unit is present in the cooling cycle, it may be appreciated by one skilled in the art to use the refrigerant from the economizer with a lower pressure differential to the evaporator pressure level for lubricating the bearing assembly 2. Thereby, the choice of refrigerant type, low or medium pressure, the number of compressor stages and the use or not use of an economizer are economic considerations. The use of an economizer unit is particularly advantageous in case the compressor unit 10 is a high-speed compressor which provides are very high pressure in the refrigerant which might be even too high for lubricating the bearing assembly 2. In this case the pressure difference between the economizer and the evaporator unit is still high enough for transporting refrigerant from through the lubricating cycle 20 and provides sufficient refrigerant at the bearing assembly 2 for lubricating.

FIG. 2 illustrates the second embodiment of the present inventive concepts. In addition to the cooling system illustrated in FIG. 1, the schematically depicted cooling system 100 of FIG. 2 has a first lubricating refrigerant supply branch 22-1, which branches off from the condenser unit 14 or economizer unit 16, and a second lubricating refrigerant supply branch 22-2 which branches off from the evaporator unit 16. The first and second lubricating refrigerant branches 22-1, 22-2 merge into a main lubricating refrigerant supply line 23. The second lubricating refrigerant supply branch 22-2 is usually used only at startup for providing a liquid refrigerant to the compressor unit 12 even before the compressor unit 12 starts operating. For that a pump unit 50 is arranged in the second refrigerant supply line 22-2 which transports liquid refrigerant from the evaporator to the compressor unit 12. Since pump 50 is only operated during startup, the energy consumption of the cooling system 100 is not unduly increased or compared to the known systems with a constantly operating pump even reduced. Additionally, the pump size may be reduced as only a small amount of refrigerant needs to be transported to the compressor in the pre-lubrication cycle. In order to avoid any reflux of the refrigerant to the evaporator unit 16, particularly during ordinary operation of the cooling system, a further check valve 28 is arranged in the second lubricating refrigerant supply line 22-2.

The pump unit 50 may be a positive displacement pump and may also be used to control the flow during ordinary operation, e.g. in case the pressure difference is fluctuating or the pressure difference is too low or too high. Positive displacement pumps have a close correlation between rotational speed and flow rate and are less affected by a pressure difference than ordinary dynamic pumps. It is further possible that the pump unit is a so-called rotary vane pump, which has advantages over the usually pumps as a they may also be used for pumping a mixture of gaseous and liquid fluids, which may be present in the evaporator.

The cooling system 100 illustrated in FIG. 2 works as follows. At startup of the cooling system, liquid refrigerant for lubrication is available in the evaporator unit 16. As the system pressure is building up, liquid refrigerant becomes available in the condenser unit 14. The lubricating refrigerant pump 50 is first pumping refrigerant from the evaporator unit 16, then after the condenser unit 14 and the evaporator unit 16 have reach a certain pressure difference level, the source of liquid refrigerant is switched to the condenser unit 14. Downstream from the pump 50, the refrigerant is supplied to the bearing assembly 2 for lubrication through a nozzle, then drains from the bearing assembly 2 to the evaporator unit 16 by feed back line 24. In high speed compressors 12, the nozzle produces a jet that spays refrigerant into the bearing assembly 2. The pressure drops through the nozzle and the nozzle controls the flow. In low speed compressors 12, jet injection may not be necessary, the refrigerant can flow into and through the bearing assembly 2 without pressure drop. In that case the pump 50 may also function as a metering device.

Figure 3:
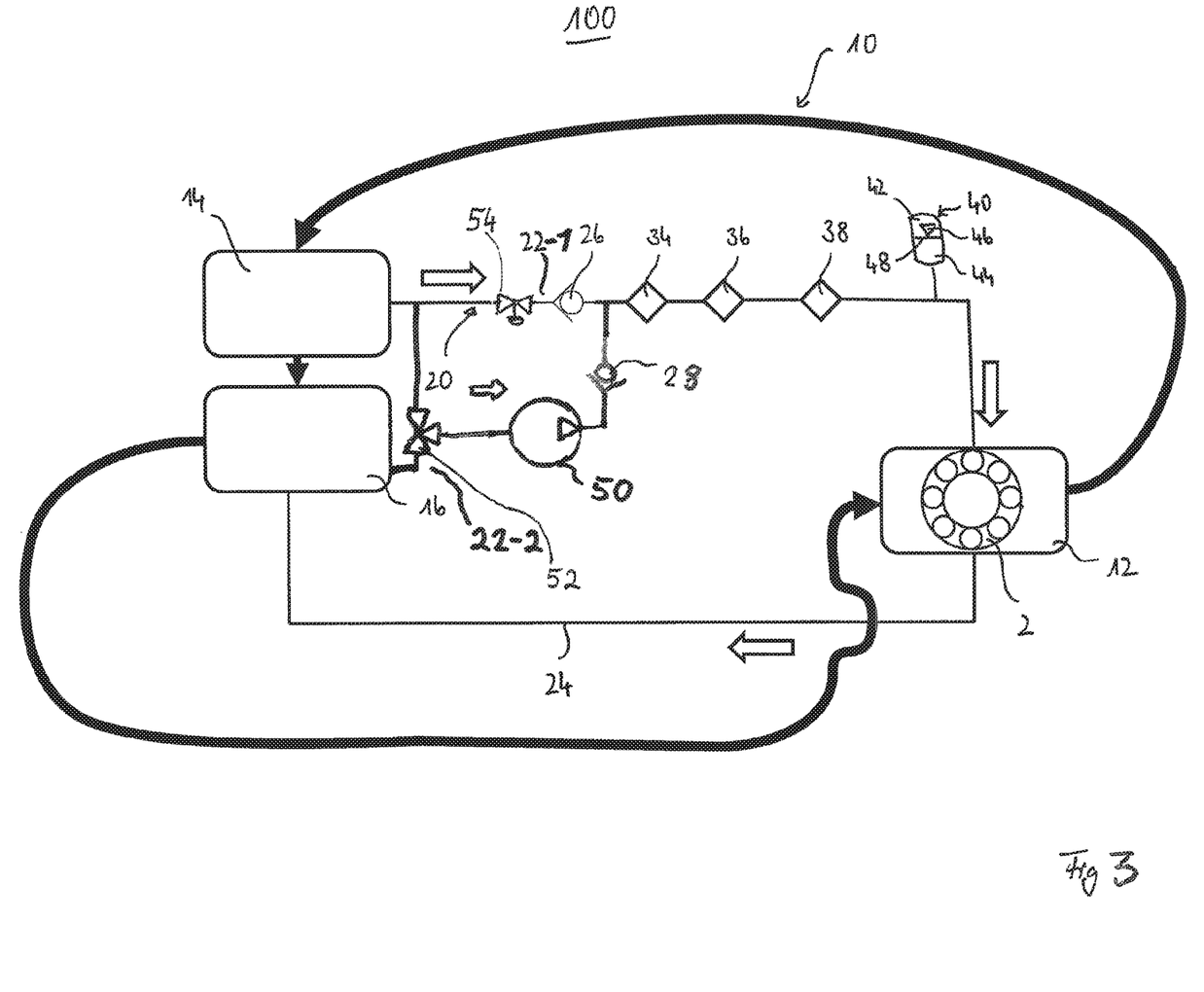
FIG. 3 illustrates a schematic illustration of another example embodiment of a cooling system with refrigerant lubricated bearing assembly.

FIG. 3 illustrates the third embodiment of the present inventive concepts. In addition to the cooling system illustrated in FIG. 2, the lubricating refrigerant pump 50 is connected to a three way valve control 52. The pump can draw liquid refrigerant from either the condenser unit 14 and/or from the economizer unit, or from the evaporator unit 16. A three way valve 52 controls form where the refrigerant is coming.

The cooling system can be driven in three operating conditions. The lubricating refrigerant pump 50 draws from the evaporator unit 16 at startup condition via the second lubricating refrigerant supply line 22-2. In a second operating condition under a steady state condition, the lubricating refrigerant pump 50 draws from the condenser unit 14 if the pressure would become too low and the lubricating refrigerant pump 50 has to start to supply lubricating refrigerant at a sufficient pressure level.

In a third operating condition under a steady state condition with sufficient pressure level from the condenser unit 14 and/or from the economizer unit the pump is not running and not integrated in the lubricating refrigerant supply line. A pressure driven flow with refrigerant from the condenser unit 14 and/or from the economizer unit is flowing via the first lubricating refrigerant supply line 22-1 to the compressor unit 12. A pressure regulator, e.g. a pressure regulating valve 54, at the outlet of the condenser unit 14 and/or the economizer unit is controlling and/or limiting the pressure of the refrigerant.

In summary the suggested cooling system has the following advantages: The lubricating refrigerant flow is provided by a pressure difference between condenser unit/economizer unit instead of a pump. This reduces the overall costs of the cooling system and increases the overall reliability of the system.

The lubricating refrigerant flow has minimal variations due to the use of an accumulator which ensures that the lubrication of the bearing assembly is continuously provided. Additionally, interruptions of the lubricating refrigerant flow are minimized. Since the pump is only used at startup and/or if for any reasons the pressure differential becomes too low, the pump wear is minimized and the additional power consumption is reduced.

By using a rotary vane type pump internal leakage is minimized and pressure is created independently of speed. By using a variable speed drive for the pump, it is further possible to start the pump at low speed for avoiding problems with cavitation, which usually occur when a mixture of liquid and gaseous fluids needs to be pumped.

By not using the pump at steady-state conditions, the overall energy consumption of the cooling system is reduced. By using a desiccant, acid and/or particle filter in the lubricating refrigerant flow, the bearing assembly's exposure to harmful substances which may corrode the bearing components is also minimized.

The invention claimed is:

1. A cooling system, comprising:
   a refrigerant cycle including cycling a refrigerant from at least a compressor unit to a condenser unit, the compressor unit configured to press a gaseous refrigerant, the condenser unit configured to condense the gaseous refrigerant to a liquid refrigerant, the refrigerant cycle including cycling the refrigerant from the condenser unit to an evaporator unit for evaporating the liquid refrigerant to the gaseous refrigerant, and the refrigerant cycle including cycling the refrigerant from the evaporator unit back to the compressor unit,
   a lubrication cycle having at least one lubricating refrigerant supply line for providing the refrigerant as a lubricant to a bearing assembly, wherein,
   the at least one lubricating refrigerant supply line branches off from the refrigerant cycle at the condenser unit for providing the refrigerant to the bearing assembly, and reunites with the refrigerant cycle at the evaporator unit for feeding back the refrigerant from the bearing assembly to the refrigerant cycle,
   a pump configured to draw the liquid refrigerant from one of the condenser unit or the evaporator unit, wherein a three way valve controls whether the refrigerant is sourced from the condenser unit or the evaporator unit, and
   an accumulator in the at least lubricating refrigerant supply line between the condenser unit and the compressor unit, the accumulator comprising a first compartment and a second compartment, the first compartment being filled with either gas or a spring, and the second compartment configured to hold the liquid refrigerant which is balanced by either compression of the gas or compression of the spring in the first compartment, wherein the liquid refrigerant in the second compartment is configured to serve as a reserve lubricant for the bearing assembly.

2. The cooling system of claim 1, wherein the lubricating refrigerant supply line terminates in at least one nozzle, the lubricating refrigerant supply line configured to provide lubricating refrigerant to the bearings assembly in the compressor unit.

3. The cooling system of claim 1, wherein the lubrication cycle comprises a first lubricating refrigerant supply branch branching off from the condenser unit and a second lubricating refrigerant supply branch branching off from the evaporator unit, wherein the first lubricating refrigerant supply line branch and the second lubricating refrigerant supply line branch are both configured to supply refrigerant to the bearing assembly.

4. The cooling system of claim 3, wherein the first and the second lubricating refrigerant supply line branch merge to a single main lubricating refrigerant supply line upstream of the bearing assembly.

5. The cooling system of claim 4, wherein the pump being arranged either in the second lubricating refrigerant supply line branch or in the single main lubricating refrigerant supply line.

6. The cooling system of claim 1, wherein at least one filter unit is arranged in the lubricating refrigerant supply line upstream of the bearing assembly.

7. The cooling system of claim 1, wherein the accumulator is arranged in the lubricating refrigerant supply line upstream of the bearing assembly.

8. A cooling system, comprising:
   a refrigerant cycle including cycling a refrigerant from at least a compressor unit to a condenser unit, the compressor unit configured to press a gaseous refrigerant, the condenser unit configured to condense the gaseous refrigerant to a liquid refrigerant, the refrigerant cycle including cycling the refrigerant from the condenser unit to an evaporator unit for evaporating the liquid refrigerant to the gaseous refrigerant, and the refrigerant cycle including cycling the refrigerant from the evaporator unit back to the compressor unit;
   a lubrication cycle having at least one lubricating refrigerant supply line for providing the refrigerant as a lubricant to a bearing assembly, wherein the at least one lubricating refrigerant supply line branches off from the refrigerant cycle at the condenser unit for providing refrigerant to the bearing assembly, and reunites with the refrigerant cycle at the evaporator unit for feeding back the refrigerant from the bearing assembly to the refrigerant cycle, wherein the lubrication cycle comprises a first lubricating the refrigerant supply branch branching off from the condenser unit and a second lubricating refrigerant supply branch branching off from the evaporator unit, wherein the first lubricating refrigerant supply line branch and the second lubricating refrigerant supply line branch are both configured to supply refrigerant to the bearing assembly, further wherein the first and the second lubricating refrigerant supply line branch merge to a single main lubricating refrigerant supply line upstream of the bearing assembly, and further wherein a pump being arranged either in the second lubricating refrigerant supply line branch or in the single main lubricating refrigerant supply line; and
   an accumulator in the at least lubricating refrigerant supply line between the condenser unit and the compressor unit, the accumulator comprising a first compartment and a second compartment, the first compartment filled with either gas or a spring, and the second compartment configured to hold the liquid refrigerant which is balanced by either compression of the gas or compression of the spring in the first compartment, wherein the liquid refrigerant in the second compartment is configured to serve as a reserve lubricant for the bearing assembly.

9. The cooling system of claim 8, wherein the first and the second lubricating refrigerant supply line branch merge to a single main lubricating refrigerant supply line upstream of the bearing assembly.

10. The cooling system of claim 8, wherein the pump being arranged either in the second lubricating refrigerant supply line branch or in the main lubricating refrigerant supply line.

11. The cooling system of claim 8, wherein at least one filter unit is arranged in the lubricating refrigerant supply line upstream of the bearing assembly.

12. The cooling system of claim 8, wherein the accumulator is arranged in the lubricating refrigerant supply line upstream of the bearing assembly.

13. A method for operating a cooling system, comprising:
activating the cooling system, wherein the cooling system comprises:
a refrigerant cycle including cycling a refrigerant from at least a compressor unit to a condenser unit, the compressor unit configured to press a gaseous refrigerant, the condenser unit configured to condense the gaseous refrigerant to a liquid refrigerant, the refrigerant cycle including cycling the refrigerant from the condenser unit to an evaporator unit for evaporating the liquid refrigerant to the gaseous refrigerant, and the refrigerant cycle including cycling the refrigerant from the evaporator unit back to the compressor unit,
a lubrication cycle having at least one lubricating refrigerant supply line for providing the refrigerant as lubricant to a bearing assembly, wherein the at least one lubricating refrigerant supply line branches off from the refrigerant cycle at the condenser unit for providing the refrigerant to the bearing assembly, and reunites with the refrigerant cycle at the evaporator unit for feeding back the refrigerant from the bearing assembly to the refrigerant cycle, and wherein the refrigerant being used as the lubricant is driven through the lubrication cycle by a pressure difference between the condenser unit and the evaporator unit; and
an accumulator in the at least lubricating refrigerant supply line between the condenser unit and the compressor unit, the accumulator comprising a first compartment and a second compartment, the first compartment filled with either gas or a spring, and the second compartment configured to hold the liquid refrigerant which is balanced by either compression of the gas or compression of the spring in the first compartment, wherein the liquid refrigerant in the second compartment is configured to serve as a reserve lubricant for the bearing assembly.

* * * * *